(12) United States Patent
Noguchi et al.

(10) Patent No.: US 7,532,556 B2
(45) Date of Patent: May 12, 2009

(54) OPTICAL RECORDING MEDIUM, RECORDING AND REPRODUCING METHOD, AND RECORDING AND REPRODUCING APPARATUS USING HEATING PULSES WHICH ARE HIGH-OUTPUT AT LEADING AND TRAILING ENDS

(75) Inventors: Soh Noguchi, Kawasaki (JP); Tsutomu Sato, Yokohama (JP); Tatsuya Tomura, Tokyo (JP); Yasunobu Ueno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/233,146

(22) Filed: Sep. 23, 2005

(65) Prior Publication Data
US 2006/0062117 A1    Mar. 23, 2006

Related U.S. Application Data

(63) Continuation of application No. PCT/JP2004/003713, filed on Mar. 19, 2004.

(30) Foreign Application Priority Data

| Mar. 24, 2003 | (JP) | ............................. 2003-079940 |
| Jan. 29, 2004 | (JP) | ............................. 2004-021902 |
| Feb. 12, 2004 | (JP) | ............................. 2004-035679 |

(51) Int. Cl.
*G11B 7/00* (2006.01)
(52) U.S. Cl. ................................................. 369/59.11
(58) Field of Classification Search ........................ None
See application file for complete search history.

(56) References Cited

U.S. PATENT DOCUMENTS

| 6,448,583 | B1 * | 9/2002 | Yoneda et al. ................ 257/81 |
| 6,628,595 | B1 | 9/2003 | Sasa et al. |
| 6,741,547 | B2 * | 5/2004 | Tomura et al. ........... 369/275.4 |
| 6,936,323 | B2 | 8/2005 | Noguchi et al. |
| 6,996,047 | B2 * | 2/2006 | Nagano ................... 369/59.11 |

(Continued)

FOREIGN PATENT DOCUMENTS

EP    1 156 482    11/2001

(Continued)

*Primary Examiner*—Joseph Feild
*Assistant Examiner*—Joseph Haley
(74) *Attorney, Agent, or Firm*—Dickstein Shapiro LLP

(57) ABSTRACT

An object is to provide a recording and reproducing method of a dyestuff-based, write-once DVD medium which can obtain a good recording waveform at a time of carrying out high linear speed recording. To this end, there are provided a recording and reproducing method and a recording and reproducing apparatus of a dyestuff-based, write-once DVD medium in which each mark other than a shortest length mark is recorded on a recording layer at an optical recording medium formed by having at least a recording layer containing an organic dyestuff on a substrate having a guide groove at which a high-frequency wobble is provided, by using one pulse light at which two places which are a leading portion and a trailing end portion of a heating pulse are made to be high-output for a given time and at which a pulse light power of the leading portion of the heating pulse is greater than a pulse light power of the trailing end portion, and the recording is reproduced by reproducing light.

19 Claims, 8 Drawing Sheets

U.S. PATENT DOCUMENTS

| | | |
|---|---|---|
| 7,133,331 B2 * | 11/2006 | Kondo et al. ............ 369/44.13 |
| 2003/0031108 A1 * | 2/2003 | Furumiya et al. ........ 369/59.12 |
| 2003/0151994 A1 | 8/2003 | Tasaka et al. |
| 2004/0027959 A1 | 2/2004 | Sasa et al. |
| 2005/0169148 A1 * | 8/2005 | Noguchi et al. .......... 369/59.11 |
| 2006/0164946 A1 * | 7/2006 | Tomura et al. ........... 369/59.11 |

FOREIGN PATENT DOCUMENTS

| | | |
|---|---|---|
| EP | 1 347 444 | 9/2003 |
| JP | 5-151638 | 6/1993 |
| JP | 5-290437 | 11/1993 |
| JP | 7-14164 | 1/1995 |
| JP | 08-295079 | 11/1996 |
| JP | 09-309268 | 12/1997 |
| JP | 10-162430 | 6/1998 |
| JP | 10-181211 | 7/1998 |
| JP | 10-226172 | 8/1998 |
| JP | 11-034499 | 2/1999 |
| JP | 11-310728 | 11/1999 |
| JP | 2000-127625 | 5/2000 |
| JP | 2000-149259 | 5/2000 |
| JP | 2000-182244 | 6/2000 |
| JP | 2000-207742 | 7/2000 |
| JP | 2001-023235 | 1/2001 |
| JP | 2002-283721 | 10/2002 |
| JP | 2002-358658 | 12/2002 |
| JP | 2002-370451 | 12/2002 |
| JP | 2003-248926 | 9/2003 |
| JP | 2004-195765 | 7/2004 |
| WO | WO 98/29257 | 7/1998 |
| WO | WO-02-089123 | 11/2002 |

* cited by examiner

OPTICAL RECORDING MEDIUM, RECORDING AND REPRODUCING METHOD, AND RECORDING AND REPRODUCING APPARATUS USING HEATING PULSES WHICH ARE HIGH-OUTPUT AT LEADING AND TRAILING ENDS

CROSS-REFERENCE TO RELATED APPLICATIONS

This is a continuation of Application No. PCT/JP2004/003713, filed on Mar. 19, 2004, the entire disclosure of which is incorporated herein by reference.

BACKGROUND OF THE INVENTION

1. Field of the Invention

The present invention relates to a recording and reproducing method and a recording and reproducing apparatus using a dyestuff-based, write-once DVD medium, and to an optical recording medium.

2. Description of the Related Art

Currently, the development of DVD-Rs as next-generation, large-capacity optical disks is advancing. The development of techniques such as the development of recording materials for miniaturizing recording pits, the use of image compression techniques typified by Moving Picture Experts Group-2 (MPEG2), the shortening of wavelengths of semiconductor lasers used for recording pit reading, and the like are needed as essential techniques for improving the recording capacity.

Heretofore, only an AlGaInP laser diode of a 670 nm band for a barcode reader or a measuring device has been merchandized as a semiconductor laser for the red wavelength region. However, as optical disks become more high density, red lasers are earnestly being used in optical storage markets. In the case of DVD drives, they are standardized at a wavelength of a semiconductor laser of the 630 to 690 nm band as a light source. On the other hand, DVD-ROM drives dedicated for reproduction are merchandized at a wavelength of about 650 nm.

Generally, in dyestuff-based, write-once DVD media at which pits (marks) are formed by a heat mode, the recording power and the pulse width of the recording pulse train formed by laser light emission at the time of recording is optimized at a specific recording speed, and the states of marks and spaces which are formed at different recording linear speeds vary. Namely, the jitter characteristic worsens due to insufficiency in the heat capacity arising due to the leading heating pulse needed for mark formation, dispersion in the average lengths of the marks due to different heating temperatures reached with respect to the optimal decomposition temperature, uniform mark widths being unable to be obtained due to the duty ratios of the optimal heating pulses being different, and the occurrence of thickening or thinning in accordance with the mark lengths.

Further, with respect to the physical formats of DVD media, in the case of the format of a DVD-R medium, it is standardized in a format in which a portion of a land portion called a land prepit is cut. When this method is adopted, at a land prepit signal (LPPb) of less than 0.16, prepit information such as the prepit address and the like cannot be reproduced well, and when it exceeds 0.32, the LPP signal itself exhibits noise-like behavior in the data region and many data errors arise. Accordingly, for the LPP, a cut width which suits the recording medium is finely-adjusted at a stamper, and the land cut width must be controlled such that LPPb is in a range of 0.16 to 0.32.

As the optical recording media using a dyestuff in the recording layer, there are, for example, a medium using a polymethine dyestuff or a polymethine dyestuff and a light stabilizer as a recording material (see Japanese Patent Application Laid-Open (JP-A) No. 10-181211), a medium using a tetraazaporphyrin dyestuff as a recording material (see JP-A No. 2002-283721), a medium using a cyanine dyestuff and an azo metal chelate dyestuff (a salt-forming dyestuff) as recording materials (see International Publication No. WO 98/029257), media using an azo metal chelate dyestuff as a recording material (see JP-A No. 2000-127625 and JP-A No. 11-310728), a medium using a formazan metal chelate dyestuff as a recording material (see JP-A No. 2001-023235), a medium using a dipyrromethene metal chelate dyestuff as a recording material (see JP-A No. 10-226172), a medium using a squarylium metal chelate dyestuff as a recording material (see JP-A No. 2002-370451), and the like. Further, many media which use dyestuffs in recording materials and carry out multi-pulse recording also are known (see JP-A No. 2000-182244 and JP-A No. 2000-207742). However, there is no disclosure or suggestion of structures which carry out recording on dyestuff-based, write-once DVD media by one pulse and which focus on the relationship with the recording waveform at the time of carrying out high linear speed recording.

Accordingly, the current situation is that there is desired the development of a recording and reproducing method and a recording and reproducing apparatus which can obtain a good recording waveform and can carry out even higher linear speed recording on dyestuff-based, write-once DVD media.

SUMMARY OF THE INVENTION

An object of the present invention is to provide a recording and reproducing method and a recording and reproducing apparatus which can obtain a good recording waveform at the time of carrying out high linear speed recording on dyestuff-based, write-once DVD media.

An object of the present invention is to provide a dyestuff-based, write-once DVD medium, which uses a semiconductor laser having an oscillation wavelength at a short wavelength as compared with CD media, and which can eliminate unrecorded regions at an additional writing portion for data in the same way as a DVD-R land prepit method, and at which there do not arise data errors caused due to leakage of an LPP signal to data portions and fine cut width control at the time of stamper manufacturing as compared with a DVD-R land prepit method, and which employs a high frequency wobble format method which is a new format method for write-once DVD systems.

Means for solving the above-described problems are as follows.

<1> A recording and reproducing method comprising recording each mark other than a shortest length mark on a medium by using one pulse light at which two places which are a leading portion and a trailing end portion of a heating pulse are made to be high-output for a given time and at which a pulse light power of the leading portion of the heating pulse is greater than a pulse light power of the trailing end portion, and reproducing the record by using a reproducing light, wherein the medium comprises a recording layer containing an organic dyestuff on a substrate having a guide groove at which a high-frequency wobble is provided. In the recording and reproducing method described in this <1>, by recording each mark other than a shortest length mark by using one pulse light at which two places which are a leading portion and a trailing end portion of a heating pulse are made to be high-output for a given time and at which a pulse light power of the leading portion of the heating pulse is greater than a pulse light power of the trailing end portion, an optimal pulse illumination pattern can be formed, and low-jitter, low-error-rate recording at any linear speed can be carried out on a dyestuff-based, write-once DVD medium, and additional writing of the data portion can be efficiently implemented in a high-frequency wobble format which can be manufactured more simply than a land prepit format used in DVD-Rs. Further, it is possible to record on a dyestuff-based, write-once DVD medium (e.g., a DVD+R) of substantially the same format as CD-Rs and CD-RWs which are currently manufactured on a mass scale.

<2> The recording and reproducing method of above <1>, wherein, when recording the marks, illumination light amounts of cooling pulses after pulse trailing end portions of all of the marks are less than or equal to 0.1 mW for a given time. In the recording and reproducing method described in this <2>, by stipulating the illumination light amounts of the cooling pulses which are after the pulse trailing end portions at the time of mark recording described in above <1>, a good recording waveform can be obtained at the time of carrying out high-speed linear recording on a dyestuff-based, write-once DVD medium.

<3> The recording and reproducing method of either above <1> or <2>, wherein a pulse light power of the shortest length mark, and the pulse light power, which is made to be high-output, of the pulse leading portion of the marks other than the shortest length mark, are made to be equal. In the recording and reproducing method described in this <3>, an optimal power distribution, which is in order for no load to be applied to the recording and reproducing apparatus, can be obtained by the recording power (pulse light power) which is made to be high output by superimposed power being applied at the time of forming each mark. At the time of carrying out high linear speed recording on a dyestuff-based, write-once DVD, a good recording waveform can be obtained.

<4> The recording and reproducing method of any of above <1> to <3>, wherein a time, over which the cooling pulse illumination light amount after the pulse trailing end portion is made to be less than or equal to 0.1 mW, is a length which is ⅙ to ⅚ of a shortest length space. In the recording and reproducing method described in this <4>, a preferable condition for the cooling pulse which is provided after the pulse trailing end portion is stipulated. By making the period of time, over which the illumination light amount of the cooling pulse after the pulse trailing end portion is less than or equal to 0.1 mW, be a length which is ⅙ to ⅚ of a shortest space length, a good recording waveform can be obtained at the time of carrying out high linear speed recording of a dyestuff-based, write-once DVD medium (e.g., a DVD+R).

<5> The recording and reproducing method of any of above <1> to <4>, wherein a leading heating pulse width of a recording pulse train forming a mark, at which a space length immediately therebefore is a shortest length, is distinguished by whether or not a length of the mark is a shortest length, and a leading heating pulse width of a shortest length mark is set to be longer than a leading heating pulse width of a mark which is not the shortest length, and, a leading heating pulse width of a recording pulse train forming the shortest length mark is distinguished by whether or not a space length immediately before the shortest length mark is the shortest length, and a leading heating pulse width of a mark, whose space length immediately therebefore is shortest, is set to be shorter than a leading heating pulse width of a mark whose space length immediately therebefore is not shortest.

<6> The recording and reproducing method of any of above <1> to <5>, wherein the high frequency wobble is a frequency of 4 T to 96 T, where T is a basic clock period.

<7> The recording and reproducing method of any of above <1> to <6>, wherein synchronization matching is carried out such that a ratio (Wo/PP) of an amplitude (Wo) of the high frequency wobble and a push-pull amplitude (PP) of a track error detecting signal for detecting and controlling track errors by a bisecting photodetector, is a following formula $0.1 \leq Wo/PP \leq 0.4$.

<8> The recording and reproducing method of any of above <1> to <7>, wherein a wavelength of recording light is 600 to 720 nm.

<9> The recording and reproducing method of any of above <1> to <8>, wherein with respect to light of a wavelength region of ±5 nm of recording light and reproducing light, a refractive index n of the recording layer single layer is $1.5 \leq n \leq 3.0$, and an exhaustion coefficient k is $0.02 \leq k \leq 0.2$.

<10> The recording and reproducing method of any of above <1> to <9>, wherein the optical recording medium is a dyestuff-based, write-once DVD medium.

<11> An optical recording medium used in the recording and reproducing method of any of above <1> to <10>.

<12> The optical recording medium of above <11>, wherein the optical recording medium has a substrate having a guide groove at which a high frequency wobble is provided, and, on the substrate, at least a reflective layer, a recording layer containing an organic dyestuff, a protective layer, an adhesive layer, and a protective substrate.

<13> The optical recording medium of either above <11> or <12>, wherein the reflective layer contains at least one type selected from gold, gold alloys, silver, silver alloys, aluminum, and aluminum alloys.

<14> The optical recording medium of any of above <10> to <12>, wherein the protective layer contains an ultraviolet curing resin.

<15> The optical recording medium of any of above <10> to <14>, wherein the adhesive layer, which is for laminating the two substrates and making a double-sided-structured optical recording medium, is provided between the two substrates, and an adhesive used in the adhesive layer is an ultraviolet curing resin.

<16> The optical recording medium of any of above <10> to <15>, wherein the optical recording medium is a write-once optical recording medium.

<17> The optical recording medium of any of above <10> to <15>, wherein the optical recording medium is used in either of a DVD-R and a DVD+R.

<18> A recording and reproducing apparatus comprising recording unit configured to record each mark other than a shortest length mark on a medium by using one pulse light at which two places which are a leading portion and a trailing end portion of a heating pulse are made to be high-output for a given time and at which a pulse light power of the leading portion of the heating pulse is greater than a pulse light power of the trailing end portion, and reproducing unit configured to reproduce the record by using reproducing light, wherein the medium comprises a recording layer containing an organic dyestuff on a substrate having a guide groove at which a high-frequency wobble is provided.

<19> The recording and reproducing apparatus of above <18>, wherein the recording means is a means which, when recording the marks, makes illumination light amounts of cooling pulses after pulse trailing end portions of all of the marks be less than or equal to 0.1 mW for a given time.

<20> The recording and reproducing apparatus of either above <18> or <19>, comprising means for making equal a pulse light power of the shortest length mark and the pulse light power, which is made to be high-output, of the pulse leading portion of the marks other than the shortest length mark.

<21> The recording and reproducing apparatus of any of above <18> to <20>, comprising means for making a time, over which the cooling pulse illumination light amount after the pulse trailing end portion is made to be less than or equal to 0.1 mW, be a length which is ⅙ to ⅚ of a shortest length space.

<22> The recording and reproducing apparatus of any of above <18> to <21>, comprising means for distinguishing a leading heating pulse width of a recording pulse train forming a mark, at which a space length immediately therebefore is a shortest length, by whether or not a length of the mark is a shortest length, and setting a leading heating pulse width of a shortest length mark to be longer than a leading heating pulse width of a mark which is not the shortest length, and distinguishing a leading heating pulse width of a recording pulse train forming the shortest length mark by whether or not a space length immediately before the shortest length mark is the shortest length, and setting a leading heating pulse width of a mark, whose space length immediately therebefore is shortest, to be shorter than a leading heating pulse width of a mark whose space length immediately therebefore is not shortest.

<23> The recording and reproducing apparatus of any of above <18> to <22>, wherein the optical recording medium is a dyestuff-based, write-once DVD medium.

Figure 1A:
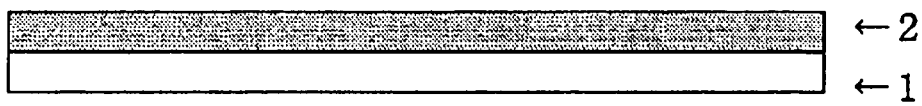
FIGS. 1A, 1B, 1C, and 1D are drawings showing examples of layer structures of a usual write-once optical recording medium.
Figure 1B:
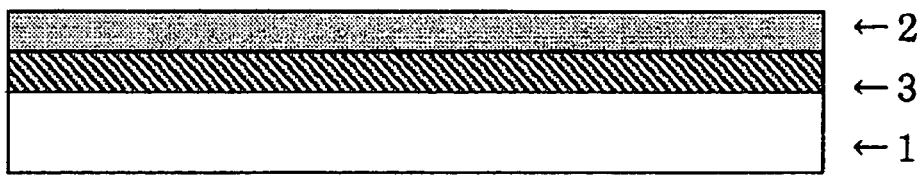
Figure 1C:
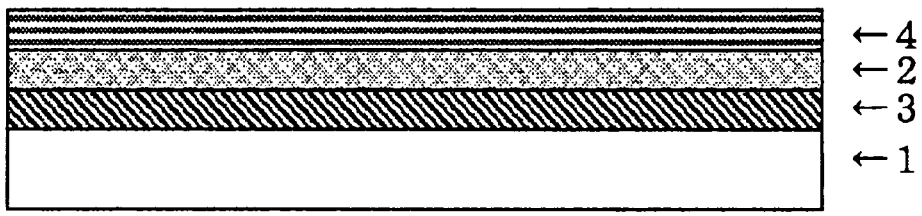
Figure 1D:

DESCRIPTION OF THE PREFERRED EMBODIMENTS (Recording and Reproducing Method)

In the recording and reproducing method of the present invention, each mark other than a shortest length mark is recorded on a recording layer at an optical recording medium formed by having at least a recording layer containing an organic dyestuff on a substrate having a guide groove at which a high-frequency wobble is provided, by using one pulse light at which two places which are a leading portion and a trailing end portion of a heating pulse are made to be high-output for a given time and at which a pulse light power of the leading portion of the heating pulse is greater than a pulse light power of the trailing end portion, and the recording is reproduced by reproducing light.

In this case, it is preferable that, when recording the marks, illumination light amounts of cooling pulses after pulse trailing end portions of all of the marks are less than or equal to 0.1 mW for a given time.

Further, by making equal the pulse light power of the shortest length mark and the pulse light power which makes the pulse leading portion of the marks other than the shortest length mark be high power, an optimal power distribution is possible because no excess load is applied to the recording and reproducing apparatus by the recording power (pulse light power) to which superimposed power is applied and which is made to be high output at the time of forming each mark.

Further, the time over which the illumination light amount of the cooling pulse, which is after the pulse trailing end portion, is made to be less than or equal to 0.1 mW, is preferably a length of ⅙ to ⅚ of the shortest length space. The effects of the present invention are difficult to achieve if it falls outside of this range.

Further, it is preferable that a leading heating pulse width of a recording pulse train forming a mark, at which the space length immediately therebefore is the shortest length, is distinguished by whether or not the length of that mark is the shortest length, and the leading heating pulse width of the shortest length mark is set to be longer than the leading heating pulse width of a mark which is not the shortest length, and, a leading heating pulse width of a recording pulse train forming the shortest length mark is distinguished by whether or not the space length immediately before that shortest length mark is a shortest length, and the leading heating pulse width of the mark, at which the space length immediately therebefore is shortest, is set to be shorter than the leading heating pulse width of a mark at which the space length immediately therebefore is not shortest.

In the present invention, for each mark other than the shortest length mark, it is particularly preferable that the length, which is made to be high output by applying the superimposed power to the pulse leading portion and trailing end portion, is in a range of ½ to 2 times a basic clock period T, i.e., 0.5 T to 2 T, and the present invention can be implemented even in a range of 0.2 T to 2.5 T. Further, the light amount of a simple pulse of the shortest length mark is, in light of waveform control, preferably substantially equal to the superimposed light amount of the leading portion of each mark except for the shortest length mark, but does not have to be equal if it is in a range in which it can be easily generated at a waveform generating circuit. As the ratio of the superimposed power, given that the pulse light power of the shortest length mark and the superimposed pulse light power of the leading portion of each mark other than the shortest length mark are W0, the superimposed pulse light power of the trailing end portion of each mark other than the shortest length mark is W1, and the no-superimposed pulse light power of the intermediate portion is W2, W0/W2 and W1/W2 are preferably 1.05 to 3.00, and 1.08 to 2.00 and in a range of W0>W1.

By selecting a pulse recording wavelength in such a range, good recording with low jittering is possible in high linear speed recording in particular.

At the dyestuff-based optical recording medium, when attempting to realize higher linear speeds, the recording power must be made to be large, and as a result, it is even easier for heat interference between marks to arise. Thus, the present invention is effective in making good the mark edge cuts at the time of forming the marks.

When recording is carried out conventionally, offset arises between the power at which the lowest jitter is obtained and the power at which errors are minimized, and the power margin decreases. Specifically, in high linear speed recording, at the recording power at which the lowest jitter is obtained, the tendency for the asymmetry of the recording signal to be toward the minus side appears, and, in error measurement, now matter how low the jitter, it is easy for errors to arise. For example, even in the case of minus asymmetry and low jitter and low errors, due to changes over time and the like of the optical recording medium and the drive, it is easier for errors to arise than at a medium which is recorded with the asymmetry being near zero.

Further, even in a case in which one mark is written by a plurality of pulse lights (multi-pulse), if the pulse lights are optimized, it is possible to solve the aforementioned low asymmetry problem. However, because a plurality of pulse lights are used, when dispersion arises in the rising and falling times of the pulse lights, there is the possibility that dispersion will arise in the recording quality itself. The higher the linear recording speed, the easier it is for this dispersion to arise.

In contrast, in the present invention, because recording is carried out by one pulse light per one mark, there is the advantage of being able to provide a recording method in which there is little dispersion in the recording quality as compared with this multi-pulse light recording. Further, in address detection during writing, because there is a more simple recording waveform than in the multi-pulse method, there are the advantages that it is easy to equalize the light amounts at the time of recording, and not only the reflected light amounts of the space portions, but the light amounts of the mark portions as well can be averaged and address detection carried out, and, even if a cooling pulse of less than or equal to 0.1 mW is provided at the trailing end of the pulse, address detection can be carried out comparatively easily.

Here, examples of recording waveforms corresponding to the present invention are shown in FIGS. 4 to 7. In this case, there are the advantages that only the shortest length mark is a simple rectangular waveform, and substantially common parameters can be selected for the parameters of the marks other than the shortest length mark, and it can be easily expanded to the drive at which it is being put into practical use. However, depending on the recording medium, in cases in which a medium of a good jitter and a simplified recording waveform is required, and in which the recording mark length is 4 T (where T expresses the basic clock period) in high speed recording, the accuracy of the rise and the fall at the low power portion in the middle must be increased. Load is applied in expanding to the drive only at this 4 T portion.

Further, in consideration of the effects of heat interference, the leading heating pulse width of the recording pulse train forming a mark, at which the space length immediately therebefore is the shortest length, is distinguished by whether or not the length of that mark is the shortest length, and the leading heating pulse width of the shortest length mark is set to be longer than the leading heating pulse width of a mark which is not the shortest length. Further, a leading heating pulse width of a recording pulse train forming the shortest length mark is distinguished by whether or not the space length immediately before that shortest length mark is a shortest length, and the leading heating pulse width of the mark, at which the space length immediately therebefore is shortest, is set to be shorter than the leading heating pulse width of a mark at which the space length immediately therebefore is not shortest. Recording with even lower jitters can thereby be realized.

For the correction amount (length) which sets the aforementioned leading heating pulse width to be short, a range of 0.02 T to 0.10 T (where T expresses the basic clock period) is particularly preferable. In a case in which the space length immediately before a mark to be formed is the shortest length, when the leading pulse width of the pulse train forming that mark is substantially equal to the case of the other marks, due to the heat interference, the space length immediately therebefore becomes short and the jitter worsens slightly. Thus, only in such a case, it is effective to shorten the leading heating pulse width for recording the mark. It goes without saying that, when it is desired to make the pulse width even shorter, it is effective to make the front edge of the leading heating pulse short.

Further, when the space length immediately before a mark to be formed is the shortest length, if the leading heating pulse width of the pulse train forming that mark is shorter than 0.10 T, it is not preferable because the mark length itself becomes too short.

The correction amount (length) at the time of setting the leading heating pulse width of the aforementioned shortest length mark to be longer than in the case of the other marks is preferably 0.05 T to 0.25 T. In particular, when the recording linear speed is great, the shortest length mark is difficult to form, and therefore, by correcting in the aforementioned range, the leading pulse width of the shortest length mark is made longer.

Concrete examples of the correction amount of the aforementioned leading heating pulse width are shown in following Table 1.

TABLE 1

|  |  | mark length to be recorded | |
|---|---|---|---|
|  |  | 3T | 4T to 14T |
| space length immediately therebefore | 3T | ±0.00T | −0.05T |
|  | 4T to 14T | +0.05T | ±0.00T |

Next, optical characteristics are given as necessary items of the recording layer in the above-described optical recording medium.

As the optical characteristics, it is preferable that a refractive index n of the recording layer single layer with respect to light of a wavelength region in a vicinity of long wavelengths of a vicinity of the recording and reproducing wavelength, i.e., with respect to light of a wavelength region of ±5 nm of the wavelength of the recording light and the reproducing light, is $1.5 \leq n \leq 3.0$, and that an exhaustion coefficient k is in a range of $0.02 \leq k \leq 0.2$. When n is less than 1.5, there are cases in which it is difficult to obtain a sufficient optical change, and the recording degree of modulation is low. When n exceeds 3.0, there are cases in which the wavelength dependence is too high, and errors arise even in the recording and reproducing wavelength range. Further, when k is less than 0.02, there are cases in which the recording sensitivity is poor. When k exceeds 0.2, there are cases in which it is difficult to obtain a reflectance of greater than or equal to 50%.

Note that DVDs are standardized in a vicinity of 650 nm at reproduction-dedicated apparatuses, and the wavelength of recording light of optical recording media is standardized at 650 to 660 nm for general applications, other than 635 nm for authoring-dedicated media. However, these wavelengths are strictly central wavelengths, and shift toward the shorter wavelength side or the longer wavelength side due to dispersion in the manufacturing of laser diodes (LDs). Further, from the standpoint of the characteristics thereof, generally, if the temperature rises, the wavelength of the LD shifts toward the longer wavelength side. The present invention is a method which can be implemented at recording wavelengths of 600 to 720 nm which include the above-described wavelength ranges.

Next, the wobble characteristic of the meandering guide groove which is provided in the substrate will be described. T for specifying the wobble frequency is the basic clock period, and in the case of a DVD (4.7 GB) medium, is about 0.133 μm, which is about 38 nsec in terms of time.

Usually, a 150 T to 400 T (where T expresses the basic clock period) equivalent is used as the wobble frequency band. However, whether frequency modulation or phase modulation, in the case of additional writing of data, the wobble frequency is too low, and quite a large space opens up between the previous data and the additionally-written data, and this frequency band is not suited to high-density recording. In contrast, in a DVD-R, an LPP is provided, and the writing position of the data is controlled by the LPP signal.

However, in the aforementioned LPP method, if the LPP signal amplitude is too small, the LPP cannot be read-out well. Conversely, if the LPP is too large, this time, the LPP signal itself leaks into the write data, and the problem occurs that many data errors arise. Accordingly, in the aforementioned LPP method, the constraints that $0.16 \leq LPPb \leq 0.32$, and preferably $0.18 \leq LPPb \leq 0.26$, arise, and at the time of stamper manufacturing, the cut widths of the lands must be finely controlled.

In contrast, if a high-frequency wobble method is used, there is no need for the LPP, the wobble is modulated, and synchronization is achieved. Therefore, a situation in which many errors arise as with the LPP method does not arise. In this case, the preferable frequency of the aforementioned high-frequency wobble is 4 T to 96 T. On the one hand, if it exceeds 4 T, it is too high frequency and detection is difficult, and there are problems also with respect to rotation control and the reliability of address sensing. On the other hand, if it is greater than 96 T, the frequency is too low, gaps open too much at the junctures at the time when data is additionally written, and problems such as a deterioration in capacity, a deterioration in the data processing speed, and the like may arise.

With regard to the amplitude of the wobble of the DVD medium which is the subject of the present invention, synchronization matching at the wobble, which is the object of the present invention, is easy if a ratio (Wo/PP), of a wobble amplitude (Wo) of a signal which has passed through appropriate filters, e.g., high and low pass filters of 4 MHz and 30 kHz, and a push-pull signal (PP) which has passed through an appropriate filter, e.g., a filter of 30 kHz, satisfies $0.1 \leq Wo/PP \leq 0.4$, and more preferably is in the range of $0.15 \leq Wo/PP \leq 0.30$. If the value of Wo/PP is less than 0.1, there is insufficient signal strength for obtaining synchronization, and if it exceeds 0.4, the data portion errors have a tendency to increase. However, as compared with the LPP method, the degree of the effect on the occurrence of data errors of a medium having a large LPP is small, and data errors accompanying an increase in the wobble amplitude are gradual.

Moreover, at the time of manufacturing the stamper, the advanced technique of controlling the cut width is needed in order to make the LPP cut width of the LPP method fall within the aforementioned range of 0.16 to 0.32. However, in the high frequency wobble method of the present invention, the object is achieved provided that the high frequency generating source and the magnitude of the oscillation amount of the wobble (the oscillation amount can be manufactured arbitrarily and with good reproducibility by a circuit which controls the wobble oscillation amount) are managed. Therefore, the yield of the stamper and the yield of the media can be rapidly improved.

Further, as the groove configuration of the substrate having the above-described format, the groove depth is preferably 1000 to 2500 Å (100 to 250 nm), and more preferably 1500 to 2000 Å (150 to 200 nm), when taking as an example a case of forming the recording layer by a solvent coating method using an organic dyestuff. If the groove depth is lower than 1000 Å, there are cases in which the push-pull signal cannot be sufficiently obtained and tracking control cannot be carried out, and if it exceeds 2500 Å, there are cases in which the transferability at the time of substrate molding is unsatisfactory.

The dyestuff groove depth in the aforementioned case in which the dyestuff recording layer is provided is preferably in the range of $1200 \leq d1 \times m \leq 160000$, given that the wobble frequency is mT (where m represents a natural number) and the dyestuff groove depth is d1. If d1×m is less than 1200, there are cases in which a sufficient difference signal cannot be obtained and sufficient tracking at the time of recording and reproducing cannot be carried out. If d1×m exceeds 160000, conversely, it oscillates and therefore is not suitable for tracking. Further, there are also limits on the substrate groove depth due to the transfer limits at the time of the aforementioned substrate molding, and d1×m substantially cannot exceed 160000.

Further, in order to ensure a capacity of a recording density of 4 to 5 GB, it is preferable that the tracking pitch is 0.64 to 0.8 μm. Although the groove width differs in accordance with the recording material as well, in substantially all organic materials, it can be used with the half-value width being in the range of 0.18 to 0.40 μm.

(Optical Recording Medium)

The optical recording medium of the present invention is used in the above-described recording and reproducing method of the present invention, and has a substrate having a guide groove at which a high frequency wobble is provided, and, on the substrate, at least a reflective layer, a recording layer containing an organic dyestuff, a protective layer, an adhesive layer, and a protective substrate, and, as needed, has other layers such as an undercoat layer, a hardcoat layer, and the like.

Figure 2A:
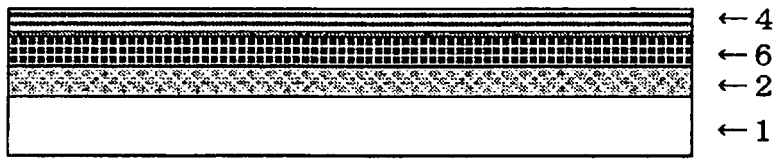
FIGS. 2A, 2B, and 2C are drawings showing examples of layer structures of a usual CD-R medium.
Figure 2B:
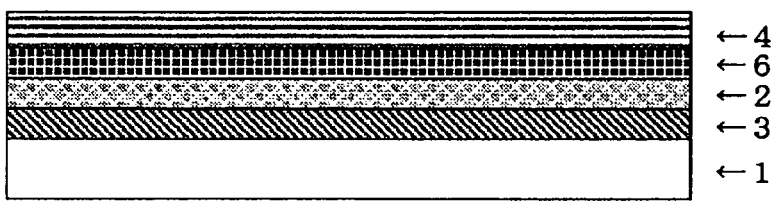
Figure 2C:
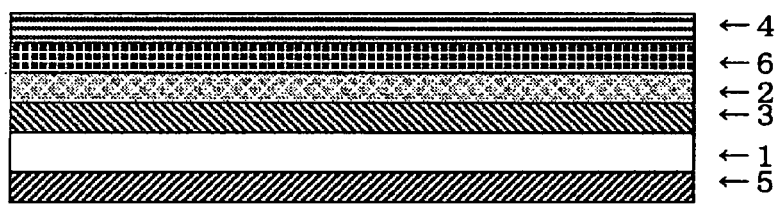
Figure 3A:
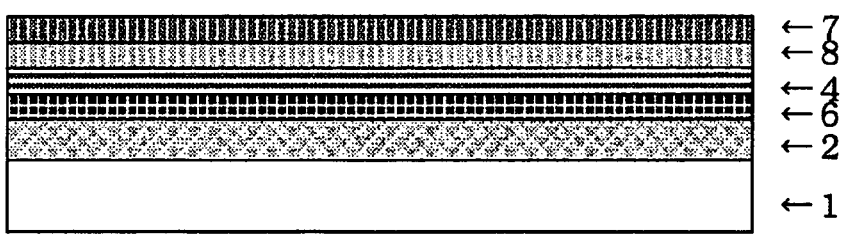
FIGS. 3A and 3B are drawings showing examples of layer structures of a dyestuff-based, write-once DVD medium of the present invention.
Figure 3B:
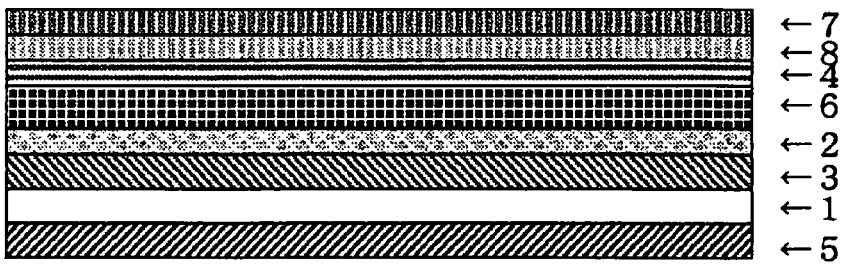
Figure 4:
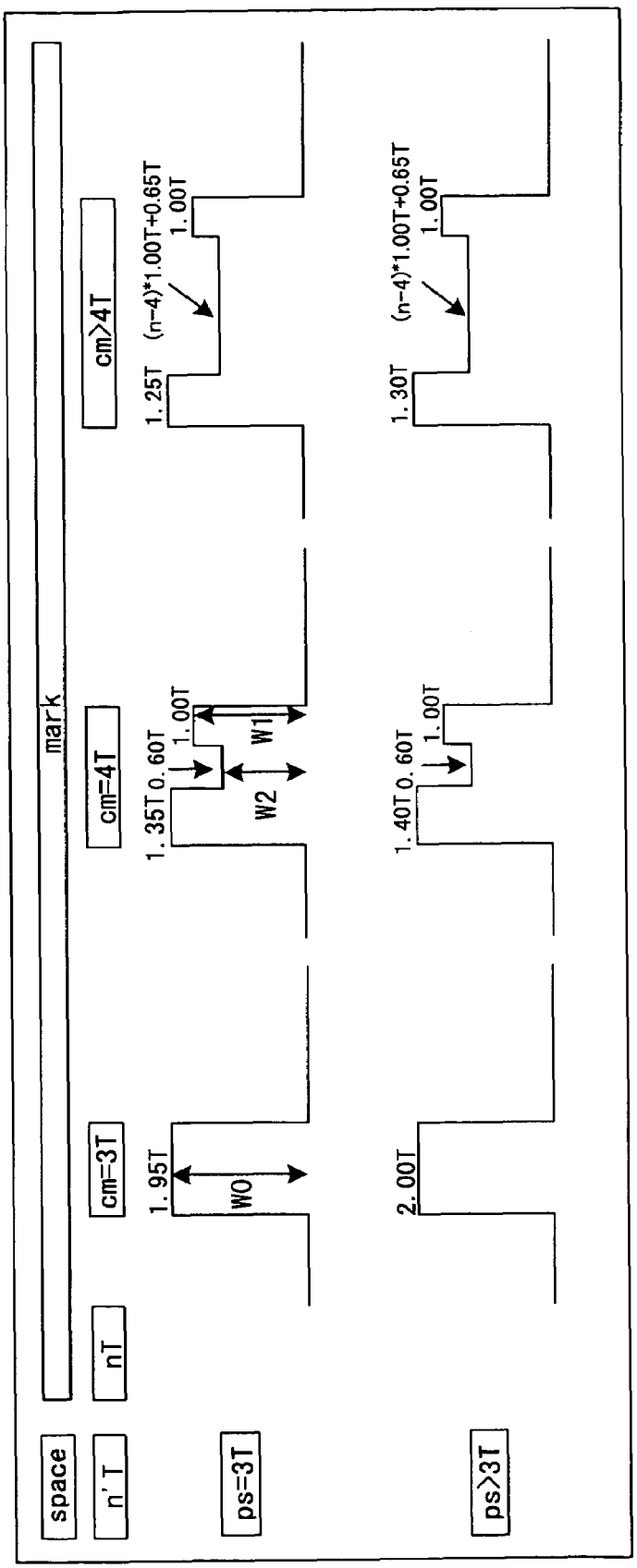
FIG. 4 is a drawing showing an example of a leading portion and trailing end portion superimposed-type light-emission waveform (without a cooling pulse) of each mark other than a shortest length mark for a recording linear speed of 28 m/s of the present invention.
Figure 5:
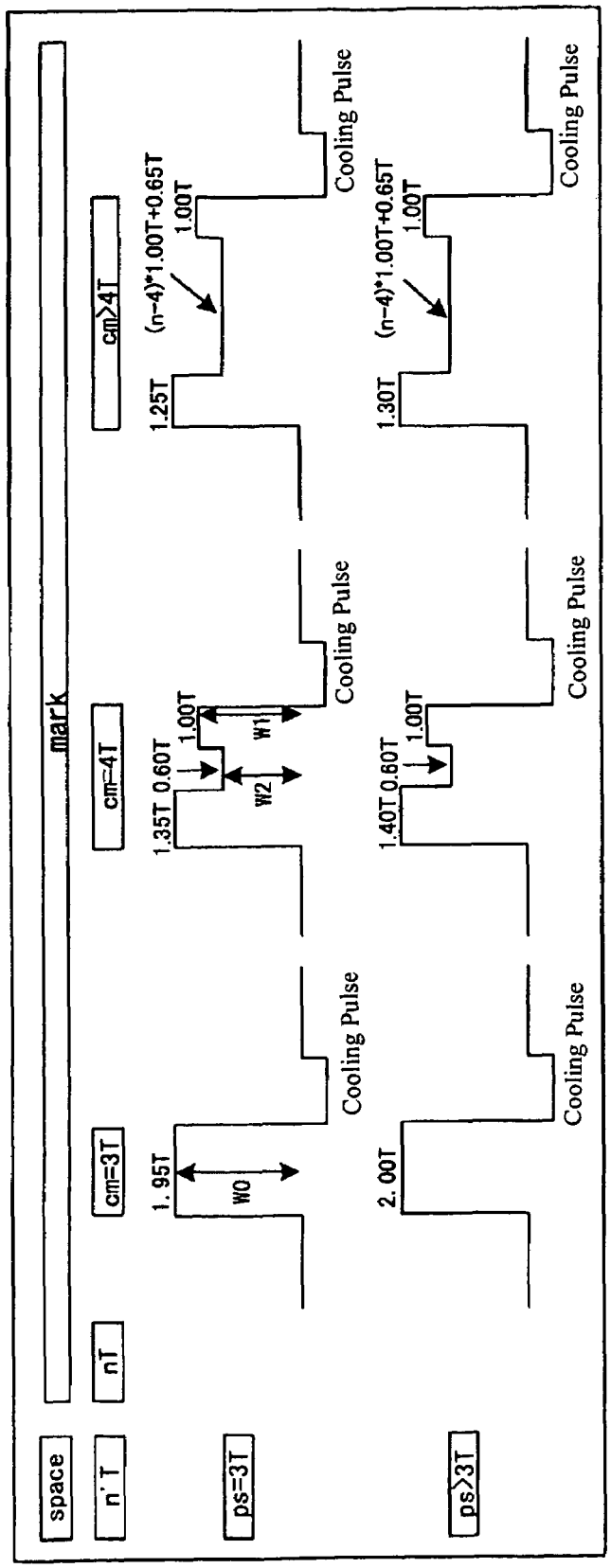
FIG. 5 is a drawing showing an example of a leading portion and trailing end portion superimposed-type light-emission waveform of each mark other than a shortest length mark for a recording linear speed of 28 m/s of the present invention.
Figure 6:
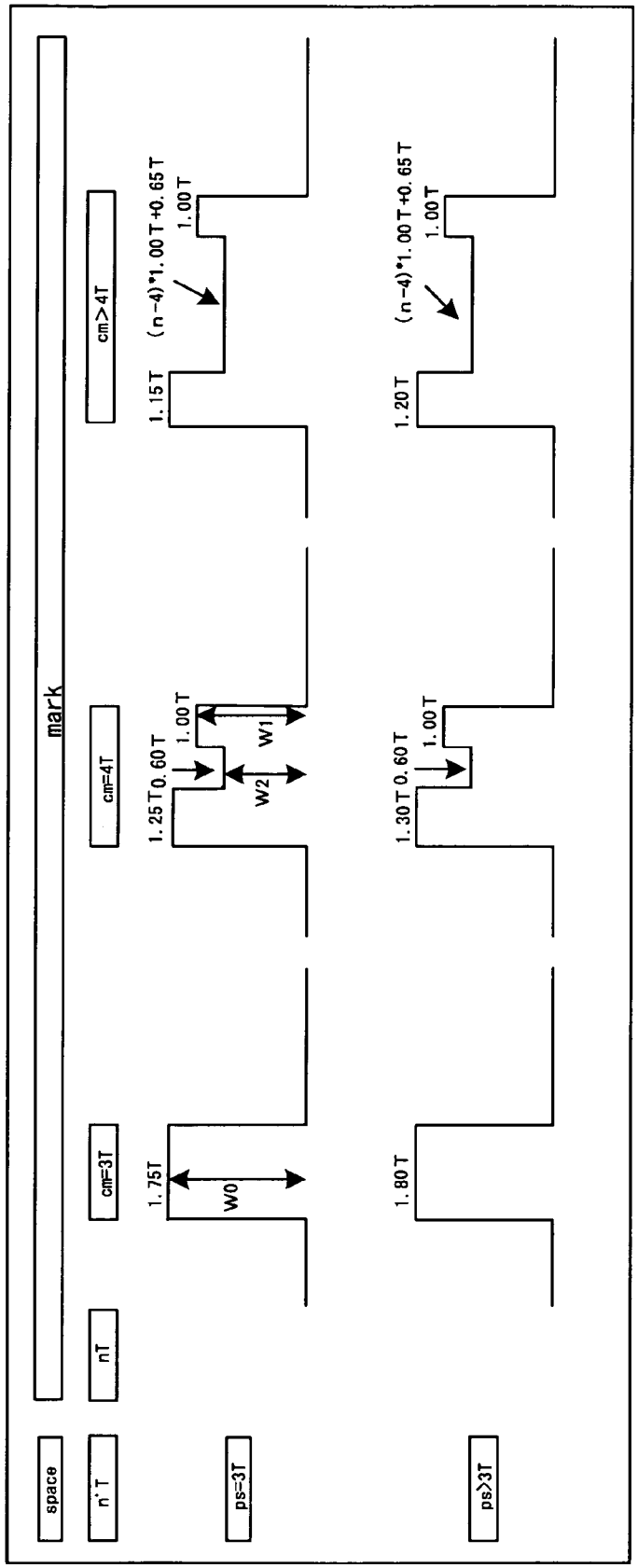
FIG. 6 is a drawing showing an example of a leading portion and trailing end portion superimposed-type light-emission waveform (without a cooling pulse) of each mark other than a shortest length mark for a recording linear speed of 21 m/s of the present invention.
Figure 7:
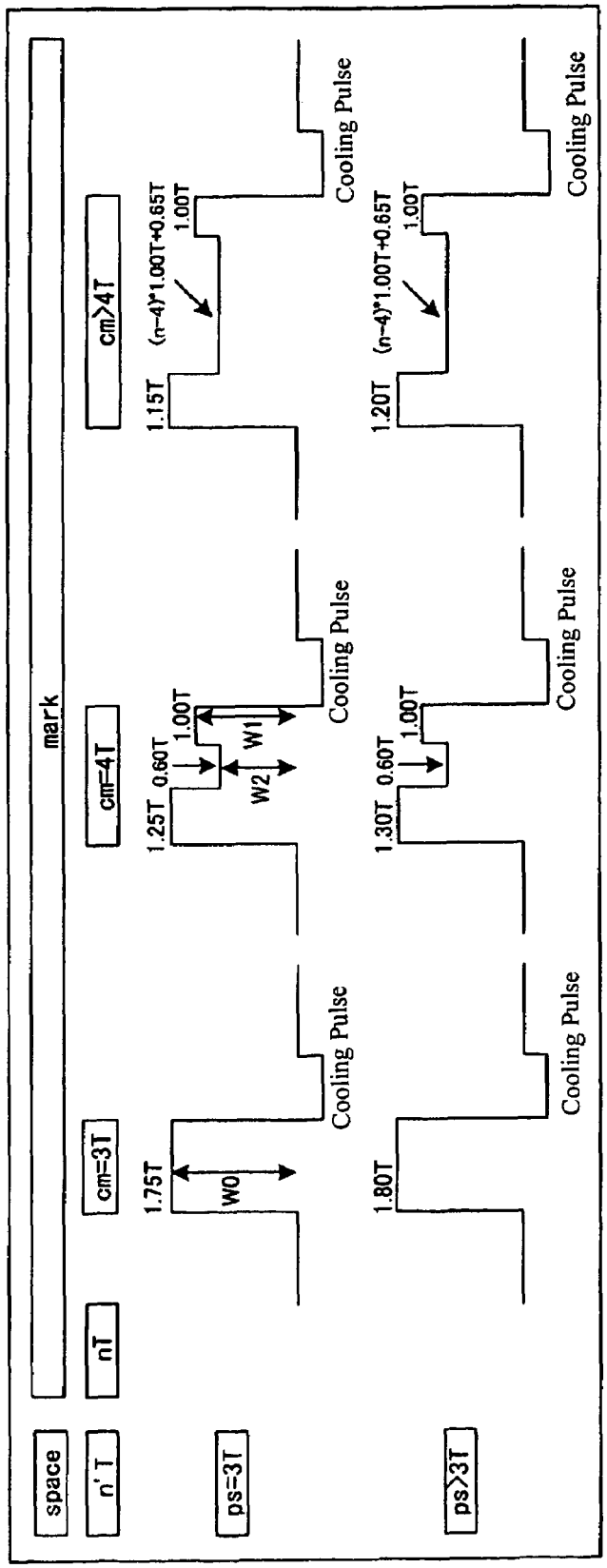
FIG. 7 is a drawing showing an example of a leading portion and trailing end portion superimposed-type light-emission waveform of each mark other than a shortest length mark for a recording linear speed of 21 m/s of the present invention.

Here, FIGS. 1A to 1D are examples of layer structures a usual write-once optical disk. FIGS. 2A to 2C are examples of layer structures of a usual CD-R medium. As shown in FIGS. 3A and 3B, the preferable basic structure of a dyestuff-based write-once DVD medium, which is the subject of the present invention, is a structure in which a first substrate and a second substrate (protective substrate) are laminated by an adhesive with a recording layer therebetween. In FIGS. 1A to 3B, 1 denotes a substrate, 2 denotes a recording layer, 3 denotes an undercoat layer, 4 denotes a protective layer, 5 denotes a substrate surface hardcoat layer, 6 denotes a reflective layer, 7 denotes a protective substrate, and 8 denotes an adhesive layer, respectively.

The recording layer may be an organic dyestuff layer single layer, or may be a laminated layer of an organic dyestuff layer and a reflective layer in order to increase the reflectance. An undercoat layer or a protective layer may be provided between the recording layer and the substrate, or, in order to improve functions, a structure may be used in which each layer is a laminated layer of two or more layers. The structure which is most usually used is a structure formed from a first substrate/an organic dyestuff layer/a reflective layer/a protective layer/an adhesive layer/a second substrate (protective substrate).

—Substrate—

As described above, the substrate has a guide groove at which a high-frequency wobble is provided. In a case in which recording and reproducing is carried out from the substrate side, the substrate must be transparent with respect to the laser which is used, but in a case in which recording and reproducing is carried out from the recording layer side, the substrate does not have to be transparent. Examples of the substrate material are plastics such as polyester resins, acrylic resins, polyamide resins, polycarbonate resins, polyolefin resins, phenol resins, epoxy resins, polyimide resins, and the like, or glass, ceramic, metal or the like can be used.

Note that preformats such as address signals or the like may further be formed on the surface of the substrate.

—Recording Layer—

At the recording layer, some type of optical change is caused due to the illumination of laser light, and information is recorded due to the change, and a dyestuff is preferable as the material thereof.

Examples of the dyestuff include azo dyestuffs, formazan dyestuffs, dipyrromethene dyestuffs, (poly)methine dyestuffs, naphthalocyanine dyestuffs, phthalocyanine dyestuffs, tetraazaporphyrin dyestuffs, squarylium dyestuffs, croconium dyestuffs, pyrylium dyestuffs, naphthoquinone dyestuffs, anthraquinone (indanthrene) dyestuffs, xanthene dyestuffs, triphenylmethane dyestuffs, azulene dyestuffs, tetrahydrocholine dyestuffs, phenanthrene dyestuffs, triphenothiazine dyestuffs, or metal complexes thereof or the like. Preferable among these are azo (metal chelate) dyestuffs, formazan (metal chelate) dyestuffs, squarylium (metal chelate) dyestuffs, dipyrromethene (metal chelate) dyestuffs, trimethinecyanine dyestuffs, and tetraazaporphyrin dyestuffs.

As the thermal decomposition characteristic of the dyestuff, a decomposition starting temperature of 100 to 360° C. is preferable, and 100 to 350° C. is more preferable. When the decomposition starting temperature exceeds 360° C., there are cases in which pit formation at the time of recording is not carried out well and the jitter characteristic worsens, whereas if it is less than 100° C., there are cases in which the storage stability of the disk deteriorates.

Another organic dyestuff, a metal, or a metal compound may be mixed together with the dyestuff for the purpose of improving the optical characteristics, the recording sensitivity, the signal characteristics, or the like. Or, a layer formed from another organic dyestuff, a metal, or a metal compound may be laminated with the dyestuff layer.

Examples of the metal or the metal compound include In, Te, Bi, Se, Sb, Ge, Sn, Al, Be, $TeO_2$, SnO, As, Cd, and the like. These may be dispersed and mixed together, or used by being laminated.

Further, polymer materials, e.g., various materials such as an ionomer resin, a polyamide resin, a vinyl resin, a natural polymer, silicone, liquid rubber or the like, or a silane coupling agent may be dispersed and mixed together in the dye, and a stabilizer (e.g., a transition metal complex), a dispersant, a fire retardant, a lubricant, an antistatic agent, a surfactant, a plasticizer, or the like can also be used together for the purpose of improving the characteristics.

Formation of the recording layer can be carried out by a usual means such as depositing, sputtering, CVD, solvent coating, or the like. When the coating method is used, the aforementioned dye and the like are dissolved in an organic solvent, and coating can be carried out by a commonly-used coating method such as spraying, roller coating, dipping, spin coating, or the like.

Examples of the organic solvent generally include alcohols such as methanol, ethanol, isopropanol, and the like; ketones such as acetone, methylethylketone, cyclohexanone, and the like; amides such as N,N-dimethylformamide, N,N-dimethylacetoamide, and the like; sulfoxides such as dimethylsulfoxide and the like; ethers such as tetrahydrofuran, dioxan, diethylether, ethyleneglycolmonomethylether, and the like; esters such as methyl acetate, ethyl acetate, and the like; aliphatic halogenated hydrocarbons such as chloroform, methylene chloride, dichloroethane, carbon tetrachloride, trichloroethane, and the like; aromatics such as benzene, xylene, monochlorobenzene, dichlorobenzene, and the like; cellusolves such as methoxyethanol, ethoxyethanol, and the like; hydrocarbons such as hexane, pentane, cyclohexane, methylcyclohexane, and the like.

The film thickness of the recording layer is preferably 100 Å to 10 μm, and more preferably 200 to 2000 Å.

—Undercoat Layer—

The undercoat layer is provided for the purposes of (1) improving adhesiveness, (2) a barrier to water or gasses or the like, (3) improving the storage stability of the recording layer, (4) improving the reflectance, (5) protecting the substrate from solvents, (6) formation of the guide grooves, the guide pits, the preformats, and the like. With respect to above purpose (1), various polymer compounds such as ionomer resins, polyamide resins, vinyl resins, natural resins, natural polymers, silicone, liquid rubber and the like, or silane coupling agents or the like can be used. With respect to above purposes (2) and (3), other than the aforementioned polymer materials, inorganic compounds such as SiO, MgF, $SiO_2$, TiO, ZnO, TiN, SiN, and the like can be used, and further, metals such as Zn, Cu, Ni, Cr, Ge, Se, Au, Ag, Al and the like or semimetals can be used. With respect to above purpose (4), metals such as Al, Au, Ag and the like, and organic thin films having metal gloss and formed from methine dyes, xanthene dyes, or the like can be used. With respect to above purposes (5) and (6), ultraviolet curing resins, thermosetting resins, thermoplastic resins, and the like can be used.

The film thickness of the undercoat layer is preferably 0.01 to 30 μm, and more preferably 0.05 to 10 μm.

—Reflective Layer—

Examples of the material of the reflective layer are metals or semimetals which are difficult to corrode and which alone obtain a high reflectance such as Au, Ag, Cr, Ni, Al, Fe, Sn, and the like, as well as alloys thereof and the like. Among these, gold, gold alloys, silver, silver alloys, aluminum, and aluminum alloys are particularly preferable from the standpoints of the reflectance and produce ability.

The film forming method of the reflective layer is not particularly limited, and may be appropriately selected in accordance with the object. Examples are depositing, sputtering, and the like.

The film thickness of the reflective layer is preferably 50 to 5000 Å, and more preferably 100 to 3000 Å.

—Protective Layer, Substrate Surface Hardcoat Layer—

The protective layer and the substrate surface hardcoat layer are used for the purposes of (1) protecting the recording layer (the reflection absorbing layer) from scratches, dust, dirt, and the like, (2) improving the storage stability of the recording layer (the reflection absorbing layer), (3) improving the reflectance, and the like. With respect to these purposes, the same materials as the undercoat layer can be used. Further, organic materials such as heat-softening, heat-fusible resins like polymethylacrylate resins, polycarbonate resins, epoxy resins, polystyrene resins, polyester resins, cellulose resins, aliphatic hydrocarbon resins, natural rubber, styrene-butadiene resin, chloroprene rubber, waxes, alkyd resins, drying oils, rosin, and the like can be used. Most preferable are ultraviolet curing resins which have excellent produceability.

The film thickness of the protective layer or the substrate surface hardcoat layer is preferably 0.01 to 30 μm, and more preferably 0.05 to 10 μm.

The undercoat layer, the protective layer, and the substrate surface hardcoat layer may, in the same way as the recording layer, contain a stabilizer, a dispersant, a fire retardant, a lubricant, an antistatic agent, a surfactant, a plasticizer, or the like.

—Protective Substrate—

In a case in which laser light is illuminated from the protective substrate side, the protective substrate must be transparent with respect to the laser light which is used. In a case in which the protective substrate is used merely as a protective plate, it does not have to be transparent.

The protective substrate material which is used is exactly the same as the substrate material. For example, plastics such as polyester resins, acrylic resins, polyamide resins, polycarbonate resins, polyolefin resins, phenol resins, epoxy resins, polyimide resins, and the like, or glass, ceramic, metal or the like can be used.

—Adhesive Layer—

The material of the adhesive layer is not particularly limited provided that it is a material which can adhere two recording materials, and can be appropriately selected in accordance with the object. In consideration of the produceability, ultraviolet curing type adhesives and hot melt type adhesives are preferable.

(Recording and Reproducing Apparatus)

The recording and reproducing apparatus of the present invention comprises recording means for carrying out recording of each mark other than a shortest length mark on a recording layer at an optical recording medium formed by having at least a recording layer containing an organic dyestuff on a substrate having a guide groove at which a high-frequency wobble is provided, by one pulse light at which two places which are a leading portion and a trailing end portion of a heating pulse are made to be high-output for a given time and at which a pulse light power of the leading portion of the heating pulse is greater than a pulse light power of the trailing end portion, and further has other means as needed.

The recording means is preferably a means which, when recording the marks, makes illumination light amounts of cooling pulses after pulse trailing end portions of all of the marks be less than or equal to 0.1 mW for a given time.

For example, an optical disk drive and the like are examples of the recording means.

As the optical recording medium, there are, for example, recordable DVDs and the like such as a DVD-RAM•WO, DVD-R, DVD+R, and a DVD-RAM, DVD-RW, DVD+RW. The former DVD-RAM•WO, DVD-R, DVD+R are DVDs which can be recorded only one time (also called DVD Write Once), and the latter DVD-RAM, DVD-RW, DVD+RW are DVDS which can be recorded plural times.

The recording and reproducing apparatus of the present invention preferably has means for making equal a pulse light power of the shortest length mark and the pulse light power, which is made to be high-output, of the pulse leading portion of the marks other than the shortest length mark.

The recording and reproducing apparatus of the present invention preferably has means for making a time, over which the cooling pulse illumination light amount after the pulse trailing end portion is made to be less than or equal to 0.1 mW, be a length which is ⅙ to ⅚ of a shortest length space.

The recording and reproducing apparatus of the present invention preferably has means for distinguishing a leading heating pulse width of a recording pulse train forming a mark, at which a space length immediately therebefore is a shortest length, by whether or not a length of the mark is a shortest length, and setting a leading heating pulse width of a shortest length mark to be longer than a leading heating pulse width of a mark which is not the shortest length, and distinguishing a leading heating pulse width of a recording pulse train forming the shortest length mark by whether or not a space length immediately before the shortest length mark is the shortest length, and setting a leading heating pulse width of a mark, whose space length immediately therebefore is shortest, to be shorter than a leading heating pulse width of a mark whose space length immediately therebefore is not shortest.

Here, one aspect of implementing the recording and reproducing method of the present invention by the recording and reproducing apparatus of the present invention will be described with reference to FIG. 8.

Figure 8:
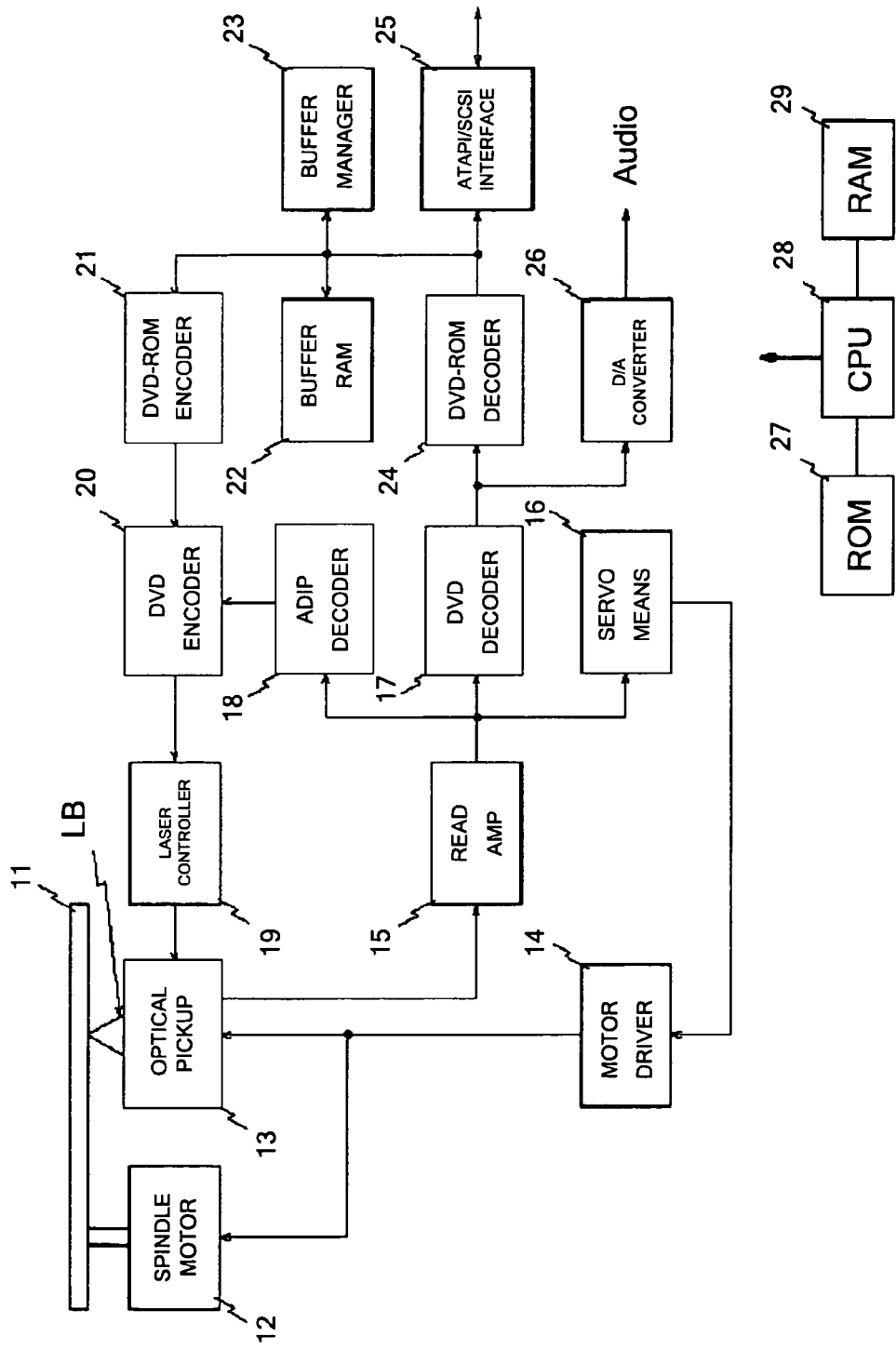
FIG. 8 is a functional block diagram showing an example of main structures of an optical disk drive.

FIG. 8 is a functional block diagram showing an example of main structures of an optical disk drive. In FIG. 8, 11 denotes an optical disk, 12 denotes a spindle motor, 13 denotes an optical pickup, 14 denotes a motor driver, 15 denotes a read amp, 16 denotes a servo means, 17 denotes a DVD decoder, 18 denotes an ADIP decoder, 19 denotes a laser controller, 20 denotes a DVD encoder, 21 denotes a DVD-ROM encoder, 22 denotes a buffer RAM, 23 denotes a buffer manager, 24 denotes a DVD-ROM decoder, 25 denotes an ATAPI/SCSI interface, 26 denotes a D/A converter, 27 denotes a ROM, 28 denotes a CPU, 29 denotes a RAM, LB denotes laser light, and Audio denotes an audio output signal.

In FIG. 8, the arrows denote the directions in which the data mainly flows. Further, in order to simplify the drawing, only a thick line is attached to the CPU 28 which controls the respective blocks of FIG. 8, and the connections with the respective blocks are omitted. A control program, which is described in a code which can be decoded at the CPU 28, is stored in the ROM 27. Note that, when the power source of the optical disk drive becomes an on state, the aforementioned program is loaded in an unillustrated main memory, and the CPU 28 controls the operations of the aforementioned respective portions in accordance with the program, and temporarily stores data and the like which are needed for control in the RAM 29.

The structure and operation of the optical disk drive are as follows. The optical disk 11 is rotated and driven by the spindle motor 12. The spindle motor 12 is controlled by the motor driver 14 and the servo means 16 such that the linear speed or the angular speed is constant. The linear speed or angular speed can be changed in a stepwise manner.

The optical pickup 13 incorporates therein a semiconductor laser, an optical system, a focus actuator, a track actuator, a light-receiving element, and a position sensor, which are omitted from the drawing, and illuminates the laser light LB onto the optical disk 11. Further, the optical pickup 13 can move in a sledge direction by a seek motor. The focus actuator, the track actuator, and the seek motor are controlled, on the basis of signals obtained from the light-receiving element and the position sensor, by the motor driver 14 and the servo means 16 such that the spot of the laser light LB is positioned at the target place on the optical disk 11.

Then, at the time of reading, a reproduction signal obtained by the optical pickup 13 is amplified at the read amp 15 and binarized, and thereafter, is inputted to the DVD decoder 17. At the DVD decoder 17, the inputted binarized data is 8/16 demodulated. Note that the recording data is collected per 8 bits and modulated (8/16modulated), and in this modulation, 8 bits are converted into 16 bits. In this case, coupling bits are applied so that the numbers of heretofore "1"'s and "0"'s become equal on average. This is called "suppressing the DC component", and slice level fluctuations of the reproduction signal from which the DC is cut are suppressed.

Processings of deinterleaving and error correction are carried out on the demodulated data. Thereafter, this data is inputted to the DVD-ROM decoder 24, and error correction processing is carried out again in order to improve the reliability of the data. The data, which has been subjected to error correction processing twice in this way, is stored once in the buffer RAM 22 by the buffer manager 23, and in a state in which it is complete as sector data, is transferred all at once to an unillustrated host computer via the ATAPI/SCSI interface 25. Note that, in the case of music data, the data outputted from the DVD decoder 17 is inputted to the D/A converter 26, and is taken-out as the analog audio output signal Audio.

Further, at the time of recording, the data which is sent in from the host computer via the ATAPI/SCSI interface 25 is stored once in the buffer RAM 22 by the buffer manager 23. Thereafter, when the recording operation is started, in this case, there is the need to position the laser spot at the writing start point beforehand. In DVD+RW/+Rs, this point is determined in advance by a wobble signal which is etched by the meandering of the tracks on the optical disk 11.

Note that, in DVD-RW/-Rs, the aforementioned point is determined by a land prepit instead of the wobble signal, and in a DVD-RAM/RAM•WOs, is determined by a prepit.

Address information called ADIP (ADress In Pre-groove) is included in the wobble signal at a DVD+RW/+R disk, and this information is taken-out by the ADIP decoder 18. Further, a synchronization signal generated by this ADIP decoder 18 is subjected to the addition of an error correction code and to interleaving at the DVD encoder 20, and it is recorded on the optical disk 11 in accordance with the recording waveform of the present invention via the laser controller 19 and the optical pickup 13.

Figure 9:
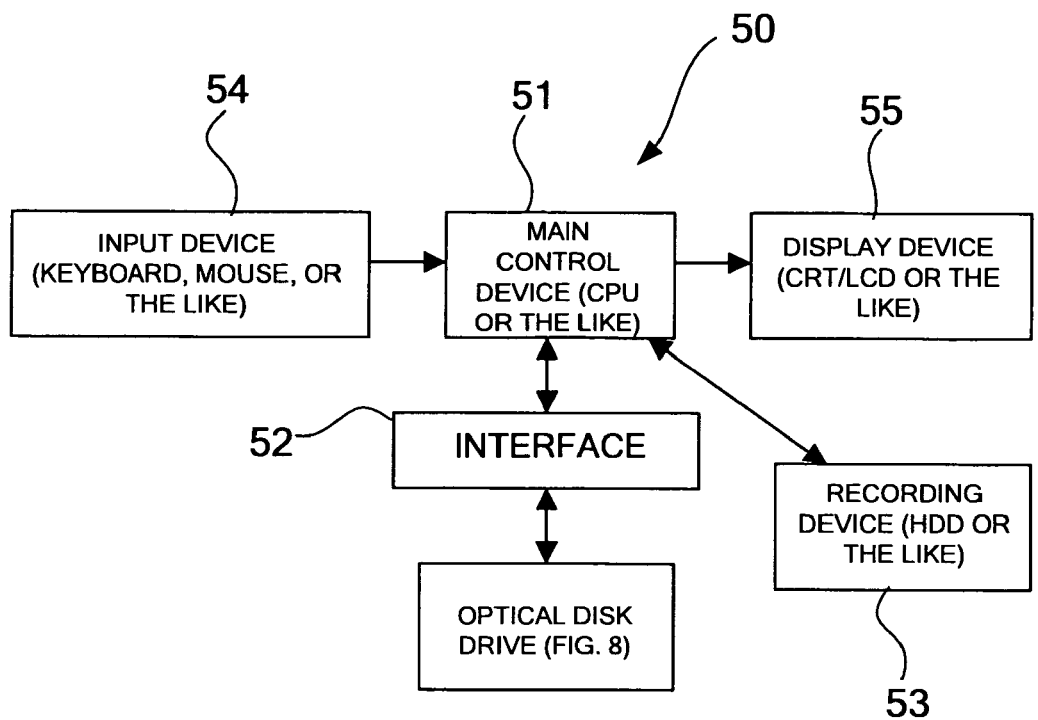
FIG. 9 is a schematic diagram of an information processing apparatus using the optical disk drive shown in FIG. 8.

Next, FIG. 9 is a schematic drawing of an information processing apparatus using the optical disk drive shown in FIG. 8.

An information processing apparatus 50 has a main control device 51, an interface 52, a recording device (HDD) 53, an input device 54, and a display device 55, and the like.

The main control device 51 is structured so as to include a microcomputer, a main memory (neither of which is illustrated), and the like, and controls the entire host.

The interface 52 is a two-way communication interface with the optical disk drive, and conforms to a standard interface such as ATAPI or SCSI or the like. The interface is connected to the interface 25 (see FIG. 8) of the optical disk drive. Note that the form of connection between the respective interfaces is not only cable connection using a communication wire such as a communication cable (e.g., a SCSI cable) or the like, and may be wireless connection using infrared rays or the like.

A program, which is described in a code which can be decoded at the microcomputer of the main control device, is stored in the recording device (HDD, hard disk) 53. Note that, when the driving power source of the information processing apparatus becomes an on state, the aforementioned program is loaded into the main memory of the main control device.

The display device 55 has a display section (not shown) such as, for example, a CRT, a liquid crystal display (LCD), a plasma display panel (PDP) or the like, and displays various types of information from the main control device.

The input device 54 has at least one input medium (not shown) among, for example, a keyboard, a mouse, a pointing device, and the like, and notifies the main control device of various types of information inputted from the user. Note that the information from the input medium may be inputted by a wireless method. Further, as structures in which the display device and the input device are integral, there are, for example, a CRT equipped with a touch panel, and the like. Moreover, the information processing apparatus is provided with an operating system (OS). In addition, all of the devices structuring the information processing apparatus are managed by the OS.

In accordance with the recording and reproducing method and recording and reproducing apparatus of the present invention, low-jitter, low-error-rate recording on a dyestuff-based, write-once DVD medium is possible at any linear speed, and additional writing of a data portion can be carried out efficiently in a high-frequency wobble format which can be manufactured more simply than a land prepit format used in a DVD-R. Further, it is possible to record on a dyestuff-based, write-once DVD medium (e.g., a DVD+R) having substantially the same format as CD-Rs and CD-RWs which are currently manufactured on a mass scale.

EXAMPLES

Hereinafter, the present invention will be described more concretely by Examples and Comparative Examples, but the present invention is not limited by these Examples.

—Manufacturing of Optical Recording Medium—

A substrate, which was formed of polycarbonate resin and had a thickness of 0.6 mm and an outer diameter of 120 mm and which had a guide groove of a groove depth of 1750 Å, a half-value width of 0.30 µm, a track pitch of 0.74 µm, and a 32 T equivalent wobble frequency, was manufactured by extrusion molding.

The compounds expressed by following structural formula (1) and structural formula (2) were weighed such that the mass ratio thereof (structural formula (1):structural formula (2)) was 60:40, and dissolved in 2,2,3,3-tetrafluoro-1-propanol and spinner coated, so as to form a recording layer of a thickness of 900 Å on the substrate, and thereafter, the structure was dried for 30 minutes at 85° C. A reflective layer formed of silver was formed to a thickness of 1100 Å on the recording layer by a sputter method. A protective layer of a thickness of 5 μm was formed of an acrylic photopolymer on the reflective layer. Thereafter, a flat-plate substrate, which was formed of polycarbonate resin and had a thickness of 0.6 mm and an outer diameter of 120 mm, was adhered by the acryl-based photopolymer. An optical recording medium (DVD+R) was thereby manufactured.

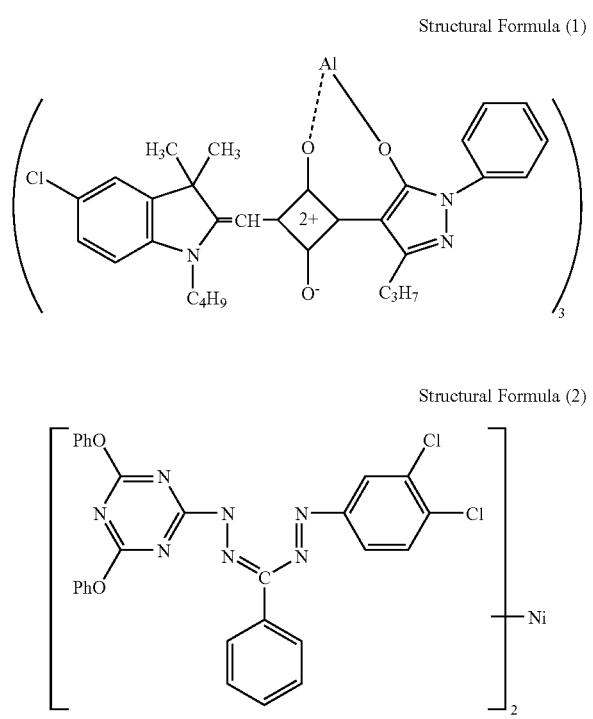

Structural Formula (1)

Structural Formula (2)

Examples 1 to 11, Comparative Examples 1 and 2

Recording and reproducing experiments were carried out as follows by using the manufactured optical recording medium (DVD+R).

<Recording and Reproducing Conditions>

In Examples 1 to 7, an EFM signal (minimum pitch length about 0.4 μm) was recorded on the above-described optical recording medium at a recording power, which was such that the bottom jitter was extremely small, under the recording conditions and at the recording linear speed shown in following Table 2 while tracking, by using semiconductor laser light of an oscillation wavelength of 660 nm and a beam diameter of 0.9 μm. The recorded places thereof were reproduced, and the jitter value, asymmetry, and number of PI errors were determined. The waveforms of the recording laser light are shown in FIGS. 4 to 7. Note that the pulse lengths of FIGS. 4 to 7 were used as the pulse lengths of linear speeds of 21 m/s and 28 m/s, but the present invention is not limited to this.

In Example 8, the cooling amount was made to be 0.4 T, which was shorter than ⅙ of the shortest space length 3 T of the present invention, i.e., 0.5 T.

In Example 9, the light amount of the cooling portion was made to be 0.7 mW, which was the same as the reproducing light power. Namely, this was a recording waveform in which no cooling pulse existed.

In Example 10, the light amount of the cooling portion was made to be 0.4 mW.

In Example 11, in the same way as in Example 9, there was no cooling, and the recording linear speed was made to be a high linear speed.

Comparative Examples 1 and 2 are cases of recording at a simple rectangular waveform.

The results of the above are shown in Table 2.

TABLE 2

| | recording linear speed (m/s) | pulse trailing end cooling power (mW) | cooling pulse length (T) | W0/W2 | W1/W2 | jitter | asymmetry | PI errors | Table 1 correction |
|---|---|---|---|---|---|---|---|---|---|
| Ex. 1 | 21 (FIG. 6) | 0 | 1 | 1.55 | 1.05 | 7.6 | 0.00 | 5 | yes |
| Ex. 2 | 21 (FIG. 6) | 0 | 1.5 | 1.60 | 1.15 | 8.4 | 0.00 | 7 | no |
| Ex. 3 | 21 (FIG. 6) | 0.1 | 0.8 | 1.65 | 1.20 | 7.3 | −0.01 | 8 | yes |
| Ex. 4 | 28 (FIG. 5) | 0 | 2.0 | 1.80 | 1.08 | 7.5 | 0.01 | 1 | yes |
| Ex. 5 | 28 (FIG. 5) | 0 | 2.0 | 1.75 | 1.08 | 7.1 | −0.01 | 8 | yes |
| Ex. 6 | 28 (FIG. 5) | 0.1 | 2.5 | 1.90 | 1.40 | 7.4 | 0.00 | 6 | yes |
| Ex. 7 | 28 (FIG. 5) | 0 | 2.0 | 1.75 | 1.25 | 7.3 | −0.02 | 7 | yes |
| Ex. 8 | 28 (FIG. 5) | 0 | 0.4 | 1.75 | 1.05 | 7.9 | −0.06 | 19 | yes |
| Ex. 9 | 21 (FIG. 6) | 0.7 | 0 | 1.55 | 1.05 | 7.8 | −0.06 | 41 | yes |
| Ex. 10 | 21 (FIG. 7) | 0.4 | 1.5 | 1.60 | 1.05 | 8.0 | −0.05 | 33 | yes |
| Ex. 11 | 28 (FIG. 4) | 0.7 | 0 | 1.80 | 1.05 | 8.2 | −0.07 | 50 | yes |
| Comp. Ex. 1 | 21 (FIG. 6) | 0.7 | 0 | 1.00 | 1.00 | 8.5 | −0.09 | 85 | yes |
| Comp. Ex. 2 | 28 (FIG. 4) | 0.7 | 0 | 1.00 | 1.00 | 8.6 | −0.09 | 100 | yes |

From the results of Table 2, all of bottom jitter, asymmetry, and PI error were excellent in Examples 1 to 8, in which the cooling power after the pulse trailing end portion was made to be less than or equal to 0.1 mW. Further, it was confirmed that, in Examples 9 to 11 in which the cooling power exceeded 0.1 mW, the bottom jitter, asymmetry, and PI error were slight inferior to those of Examples 1 to 8, but were excellent as compared with Comparative Examples 1 and 2.

Example 12 and Comparative Examples 3 to 5

In Example 12, an EFM signal (minimum pitch length about 0.4 μm) was recorded on the above-described optical recording medium at a recording power, which was such that the bottom jitter was extremely small, under the conditions of the recording conditions and the recording linear speed shown in following Table 3 and with the correction of Table 1, while tracking, by using semiconductor laser light of an oscillation wavelength of 660 nm and a beam diameter of 0.9 μm. These places were reproduced, and the jitter value, asymmetry, and number of PI errors were determined. The results are shown in Table 3.

In Comparative Examples 3 to 5, optical recording media (DVD-Rs) were manufactured in the same way as in the Examples, except that a molded substrate and a trial condition stamper, in which the magnitude of the land prepit signal (LPPb) of the LPP format implemented at a DVD+R was varied (changed), were used. The same type of evaluation as in Example 12 was carried out. The results are shown in Table 3.

TABLE 3

| | recording speed (m/s) | pulse trailing end cooling power (mW) | cooling pulse length (T) | W0/W2 | W1/W2 | jitter | assymetry | PI errors | LPPb value |
|---|---|---|---|---|---|---|---|---|---|
| Ex. 12 | 21 (FIG. 7) | 0 | 1.5 | 1.60 | 1.05 | 7.7 | 0.00 | 7 | none |
| Comp. Ex. 3 | 21 (FIG. 7) | 0 | 1.5 | 1.60 | 1.05 | 7.8 | 0.00 | 8 | 0.10 |
| Comp. Ex. 4 | 21 (FIG. 7) | 0 | 1.5 | 1.60 | 1.05 | 8.0 | 0.00 | 40 | 0.24 |
| Comp. Ex. 5 | 21 (FIG. 7) | 0 | 1.5 | 1.60 | 1.05 | 8.0 | 0.00 | 456 | 0.37 |

From the results of Table 3, in the samples (DVD-Rs) of the LPP format of Comparative Examples 3 to 5, when the land prepit signal (LPPb) was large, the PI errors increased even though the jitter was good. Further, it was confirmed that, when the LPPb was a level less than 0.16 as in Comparative Example 3, address detection in the apparatus which was used in actuality was impossible.

In accordance with the present invention, low-jitter, low-error-rate recording on a dyestuff-based, write-once DVD medium is possible at any linear speed, and the additional writing of a data portion can be carried out efficiently in a high-frequency wobble format which can be manufactured more simply than a land prepit format used in a DVD-R. Further, it is possible to record on a dyestuff-based, write-once DVD medium (e.g., a DVD+R) of substantially the same format as CD-Rs and CD-RWs which are currently manufactured on a mass scale.

What is claimed are:

1. A recording and reproducing method comprising:
   recording a mark other than a shortest length mark on a medium by using one pulse light; and
   reproducing the mark as a record by using a reproducing light,
   wherein the medium comprises a recording layer containing an organic dyestuff on a substrate having a guide groove at which a high-frequency wobble is provided,
   wherein the pulse light for recording a mark other than a shortest length mark is a heating pulse,
   wherein the heating pulse comprises:
      a leading portion;
      a middle portion; and
      a trailing end portion,
   wherein the heating pulse is made to be high-output for a given time at the leading portion, and a power of the leading portion is greater than a power of the trailing end portion,
   wherein the heating pulse is made to be high-output for a given time at the trailing end portion, and the power of the trailing end portion is greater than a power of the middle portion, and
   wherein a leading heating pulse width of a recording pulse train forming a mark, at which a space length immediately therebefore is a shortest length, is distinguished by whether or not a length of the mark is a shortest length, and a leading heating pulse width of a shortest length mark is set to be longer than a leading heating pulse width of a mark which is not the shortest length, and, a leading heating pulse width of a recording pulse train forming the shortest length mark is distinguished by whether or not a space length immediately before the shortest length mark is the shortest length, and a leading heating pulse width of a mark, whose space length immediately therebefore is shortest, is set to be shorter than a leading heating pulse width of a mark whose space length immediately therebefore is not shortest.

2. The recording and reproducing method according to claim 1, wherein a time, over which a cooling pulse illumination light amount after the pulse trailing end portion is made to be less than or equal to 0.1 mW, is a length which is ⅙ to ⅚ of the shortest length space.

3. The recording and reproducing method according to claim 1, wherein the high frequency wobble is a frequency of 4 T to 96 T, where T is a basic clock period.

4. The recording and reproducing method according to claim 1, wherein synchronization matching is carried out such that a ratio (Wo/PP) of an amplitude (Wo) of the high frequency wobble and a push-pull amplitude (PP) of a track error detecting signal for detecting and controlling track errors by a bisecting photodetector, is a following formula $0.1 \leq Wo/PP \leq 0.4$.

5. The recording and reproducing method according to claim 1, wherein a wavelength of recording light is 600 to 720 nm.

6. The recording and reproducing method according to claim 1, wherein with respect to light of a wavelength region of +5 nm of recording light and reproducing light, a refractive index n of the recording layer single layer is $1.5 \leq n \leq 3.0$, and an exhaustion coefficient k is $0.02 \leq k \leq 0.2$.

7. The recording and reproducing method according to claim 1, wherein the medium is a dyestuff-based, write-once DVD medium.

8. An optical recording medium used in the recording and reproducing method according to claim 1.

9. The optical recording medium according to claim 8, wherein the optical recording medium has a substrate having a guide groove at which a high frequency wobble is provided, and, on the substrate, at least a reflective layer, a recording layer containing an organic dyestuff, a protective layer, an adhesive layer, and a protective substrate.

10. The optical recording medium according to claim 8, wherein the reflective layer contains at least one type selected from gold, gold alloys, silver, silver alloys, aluminum, and aluminum alloys.

11. The optical recording medium according to claim 7, wherein the protective layer contains an ultraviolet curing resin.

12. The optical recording medium according to claim 7, wherein the adhesive layer, which is for laminating the two substrates and making a double-sided-structured optical recording medium, is provided between the two substrates, and an adhesive used in the adhesive layer is an ultraviolet curing resin.

13. The optical recording medium according to claim 7, wherein the optical recording medium is a write-once optical recording medium.

14. The optical recording medium according to claim 7, wherein the optical recording medium is used in either of a DVD-R and a DVD+R.

15. A recording and reproducing apparatus comprising:
a recording unit configured to record each mark other than a shortest length mark on a medium by using one pulse light at which two places which are a leading portion and a trailing end portion of a heating pulse are made to be high-output for a given time and at which a pulse light power of the leading portion of the heating pulse is greater than a pulse light power of the trailing end portion, and reproducing unit configured to reproduce the record by using reproducing light, wherein the medium comprises a recording layer containing an organic dyestuff on a substrate having a guide groove at which a high-frequency wobble is provided; and further comprising a means for distinguishing a leading heating pulse width of a recording pulse train forming a mark, at which a space length immediately therebefore is a shortest length, by whether or not a length of the mark is a shortest length, and setting a leading heating pulse width of a shortest length mark to be longer than a leading heating pulse width of a mark which is not the shortest length, and distinguishing a leading heating pulse width of a recording pulse train forming the shortest length mark by whether or not a space length immediately before the shortest length mark is the shortest length, and setting a leading heating pulse width of a mark, whose space length immediately therebefore is shortest, to be shorter than a leading heating pulse width of a mark whose space length immediately therebefore is not shortest.

16. The recording and reproducing apparatus according to claim 15, wherein the recording unit, when recording the marks, makes illumination light amounts of cooling pulses after pulse trailing end portions of all of the marks be less than or equal to 0.1 mW for a given time.

17. The recording and reproducing apparatus according to claim 15, comprising means for making equal a pulse light power of the shortest length mark and the pulse light power, which is made to be high-output, of the pulse leading portion of the marks other than the shortest length mark.

18. The recording and reproducing apparatus according to claim 15, comprising means for making a time, over which the cooling pulse illumination light amount after the pulse trailing end portion is made to be less than or equal to 0.1 mW, be a length which is ⅙ to ⅚ of a shortest length space.

19. The recording and reproducing apparatus according to claim 15, wherein the medium is a dyestuff-based, write-once DVD medium.

* * * * *